Oct. 21, 1924.  1,512,328
R. R. BELL
SELF ADJUSTING BEARING
Filed Dec. 3, 1921
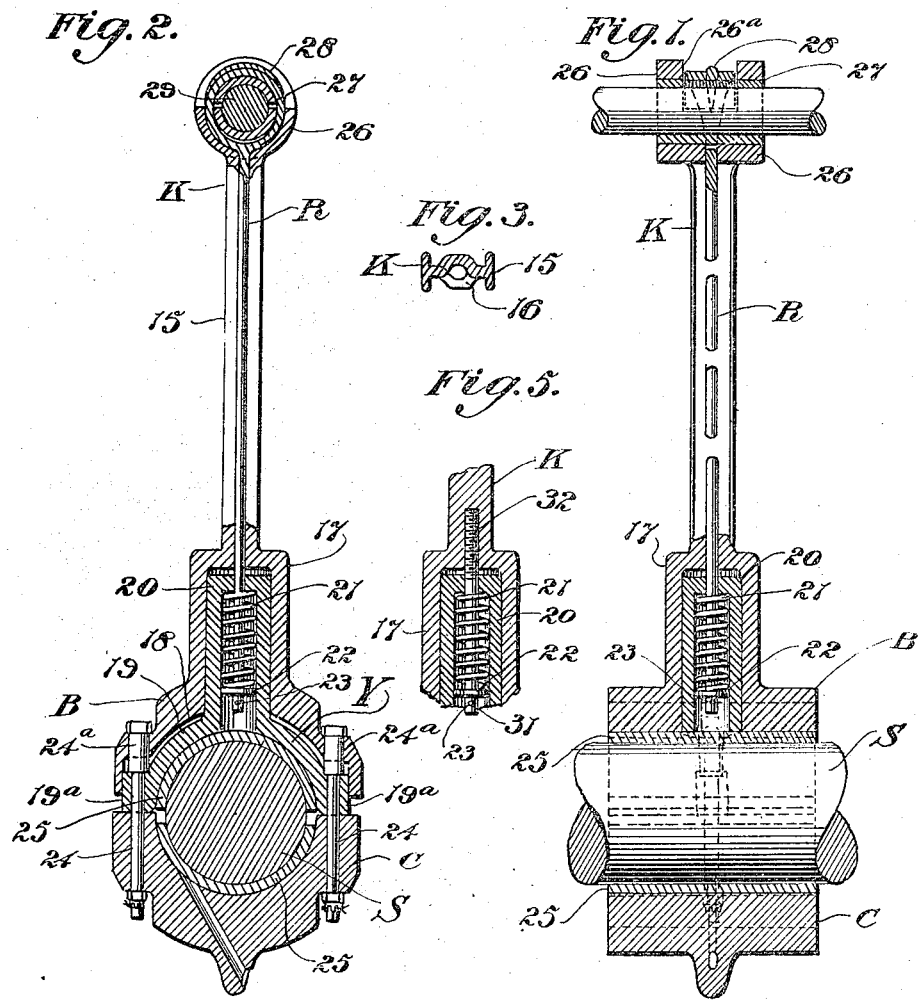
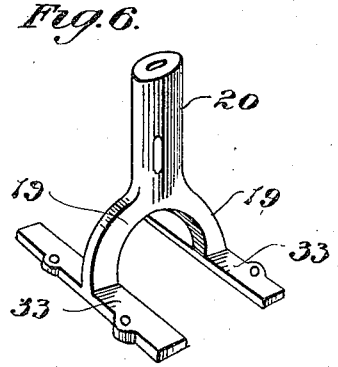
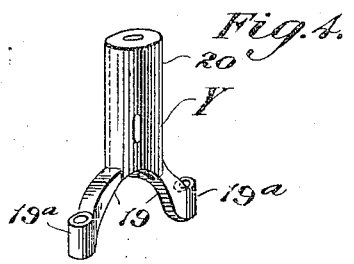
Inventor:
Rollo R. Bell.
by Hazard & Miller
Attys Patented Oct. 21, 1924.

1,512,328

UNITED STATES PATENT OFFICE.

ROLLO R. BELL, OF HOLLYWOOD, CALIFORNIA.

SELF-ADJUSTING BEARING.

Application filed December 3, 1921. Serial No. 519,709.

*To all whom it may concern:*

Be it known that I, ROLLO R. BELL, a citizen of the United States, residing at Hollywood, in the county of Los Angeles and State of California, have invented new and useful Improvements in Self-Adjusting Bearings, of which the following is a specification.

My invention relates to bearings for connecting rods and the like, and a purpose of my invention is the provision of a bearing which is self-adjusting to automatically absorb the wear of the liners so that a tight bearing will at all times be insured.

It is also a purpose of my invention to provide a novel form of connecting rod and self-adjusting bearings particularly adapted for use in internal combustion engines for motor vehicles whereby the necessity of frequently tightening the bearings and the disadvantages attendant thereto are eliminated.

I will describe two forms of bearings and one form of connecting rod each embodying my invention, and will then point out the novel features thereof in claims.

In the accompanying drawings,

Figure 1 is a view showing in side elevation and partly in section one form of connecting rod and two forms of bearings all embodying my invention.

Fig. 2 is a sectional view taken at right angles to Fig. 1.

Fig. 3 is a transverse section of the connecting rod shown in the preceding views.

Fig. 4 is an enlarged fragmentary perspective view of the yoke comprised in one of the bearings shown in the preceding views.

Fig. 5 is a fragmentary sectional view showing in slightly modified form one of the bearings shown in Figs. 1 and 2.

Fig. 6 is a view similar to Fig. 4 showing a modified form of yoke.

Similar reference characters refer to similar parts in each of the several views.

Referring specifically to the drawings, my invention, in its present embodiment, comprises a connecting rod designated generally at K and including a shank portion 15 which is shown in Fig. 3 formed from a channel iron with the web portion thereof split and outstruck at intervals to provide sleeves 16 in which a rod R is adapted to slide. The lower end of the connecting rod is provided with a bearing block B formed centrally thereof, or in longitudinal alinement with the shank 15, with a sleeve 17 which communicates with circumferentially extending grooves 18. As shown in Fig. 2, the grooves 18 are arranged at opposite points with respect to the lower end of the sleeve 17, and in these grooves the curved arms 19 of a yoke Y are adapted to repose. The yoke Y also includes a hollow head portion 20 which extends into the sleeve 17 and slidably receives the lower end of the rod R, the upper end of the sleeve and head being formed with suitable openings for the reception of the rod. Surrounding the rod at a point within the head 20 is a coil expansible spring 21 which is confined upon the rod by means of a washer 22 secured against displacement from the rod by a key 23.

As shown in Fig. 2, the bearing block B is provided with the usual cap C secured thereto by means of bolts 24 which also extend through the enlarged extremities 19ª of the arms 19. The bolts 24 are provided with enlarged heads 24ª loosely fitted within the bearing block B, so that the yoke and cap as a unit are free to move upwardly with respect to the block, it being understood that the grooves 18 allow for this upward movement. This bearing is adapted to receive the crank shaft S of an internal combustion engine, and brasses 25 embrace the shaft within the bearing in the usual manner.

The upper end of the connecting rod K is formed with a sleeve 26 in which are fitted brasses 27. As shown in Fig. 1, the upper portion of the sleeve 26 is recessed as indicated at 26ª, and the upper brass is recessed at a corresponding point. The upper end of the rod R extends into the sleeve 26 and is there provided with a circular head 28 which is disposed within the recess portions of the sleeve and brass and in embracing position to the brasses. As will be understood, the sleeve 26 receives the wrist pin 29 of a piston, and the circular head 28 allows of the application of the brasses to the pin.

In practice, with the connecting rod associated with the wrist pin and crank shaft, it will be clear that the spring 21 exerts a downward pull upon the rod R and an upward pull on the yoke Y. By virtue of this action, a constant downward pressure is exerted on the brass 27, and an upward pressure exerted on the cap C, so that in both instances the bearings as a unit are constantly tending to tighten themselves about the members S and 29 to take up any wear of the bearings so that they will at all times remain tight.

In Fig. 5, I have shown the rod R formed of a relatively short section 31, the upper end of which is threadedly fitted in the connecting rod K as indicated at 32. This section of rod 31 is surrounded by the spring 21 and extends into the head 20 so as to operate in a manner identical to the rod in the first form of my invention. The purpose of this construction is to allow the adjustment of only the lower or crank shaft bearing, as in some instances it may not be desirable to have a self-adjusting wrist pin bearing.

The crank shaft bearing shown in Figs. 1 and 2 is of the two-bolt type, and consequently a yoke of the type shown in Fig. 4 is employed. However, when applying my invention to a bearing of the four-bolt type, the yoke, such as that shown in Fig. 6, is employed. This yoke is substantially of the same construction as the yoke shown in Fig. 4, with the exception that the arms 19 are provided with angularly arranged extensions 33 through which the bolts of the bearing are adapted to extend.

Although I have herein shown and described only two forms of bearings and one form of connecting rod each embodying my invention, it is to be understood that various changes and modifications may be made herein without departing from the spirit of the invention and the spirit and scope of the appended claims.

What I claim is:

1. In combination, a connecting rod including a bearing block formed at one end and a bearing sleeve at the other end, said bearing block being formed centrally with a sleeve and grooves in the face of the block extending from said sleeve, a cap movably supported on the bearing block, a yoke within the bearing block and including arms disposed in said grooves and a head disposed in said sleeve, a rod slidably fitted in the connecting rod and extending into said head, an annular head formed on one end of the rod and extending into said bearing sleeve, a brass embraced by said annular head, an expansible spring in the first head and surrounding said rod, and means for confining the spring on the rod, all for the purpose described.

2. A self-adjusting bearing comprising a bearing block including a centrally arranged sleeve portion and grooves formed in the working face of the block, a cap movably supported on the bearing block, a yoke including a head portion disposed within said sleeve and arms disposed in said grooves and secured to said cap, and a spring associated with said head for urging the yoke and consequently the cap toward said block.

3. In combination, a connecting rod having the shank thereof outstruck at intervals to provide sleeves, a rod slidably fitted in the sleeves, a bearing block formed in one end of the connecting rod and slidably receiving one end of the second rod, a cap movably sustained on the bearing block, a yoke movable within the bearing block and rigidly connected to said cap, an annular head formed on the other end of the second rod, a sleeve bearing formed on the other end of the connecting rod and constructed to movably receive said annular head, a brass movably mounted on the bearing sleeve and embraced by said annular head, and a spring mounted in the yoke and associated with said rod in such manner that the yoke and consequently the cap are constantly urged toward the bearing block and the annular head and consequently the brass urged inwardly of said bearing sleeve.

4. A self-adjusting bearing comprising a bearing block, a yoke movable in the block, a cap, bolts for movably sustaining the yoke and cap on the block, shoulders formed on the bolts for causing the cap and yoke to move together on movement of the bolts, and a spring engaging the yoke for constantly urging the latter and consequently the cap toward the block.

5. A self-adjusting bearing, comprising a bearing block, a yoke movable on the block, a cap, bolts for movably sustaining the yoke and cap on the block, and a compression spring engaging the yoke for constantly urging the latter and consequently the cap toward the block.

In testimony whereof I have signed my name to this specification.

ROLLO R. BELL.